No. 733,428. PATENTED JULY 14, 1903.
W. C. SARGEANT & J. J. BARKER.
MACHINE FOR FORMING TAPERED TUBES.
APPLICATION FILED JAN. 31, 1902.
NO MODEL. 2 SHEETS—SHEET 1.
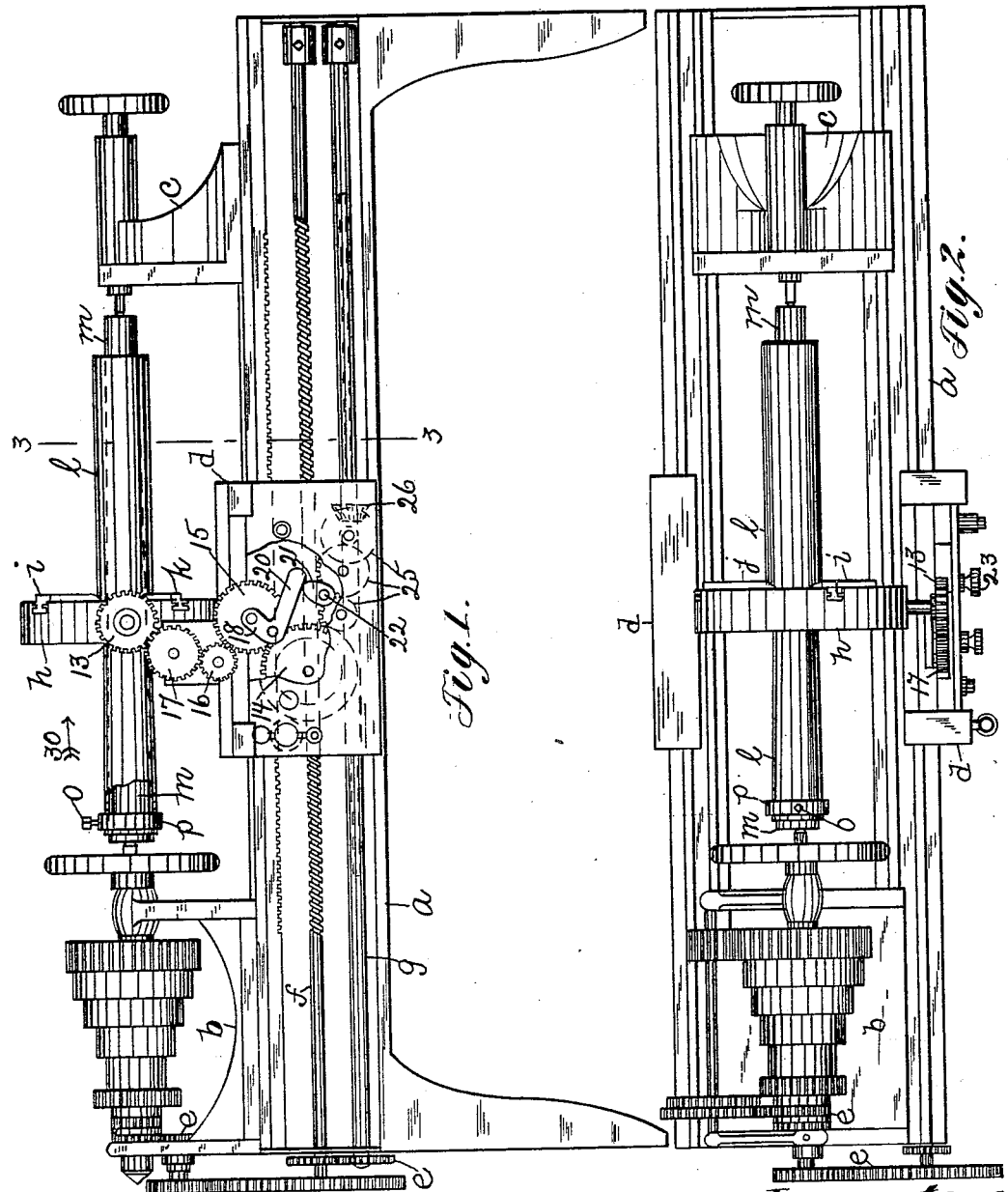

No. 733,428. PATENTED JULY 14, 1903.
W. C. SARGEANT & J. J. BARKER.
MACHINE FOR FORMING TAPERED TUBES.
APPLICATION FILED JAN. 31, 1902.
NO MODEL. 2 SHEETS—SHEET 2.
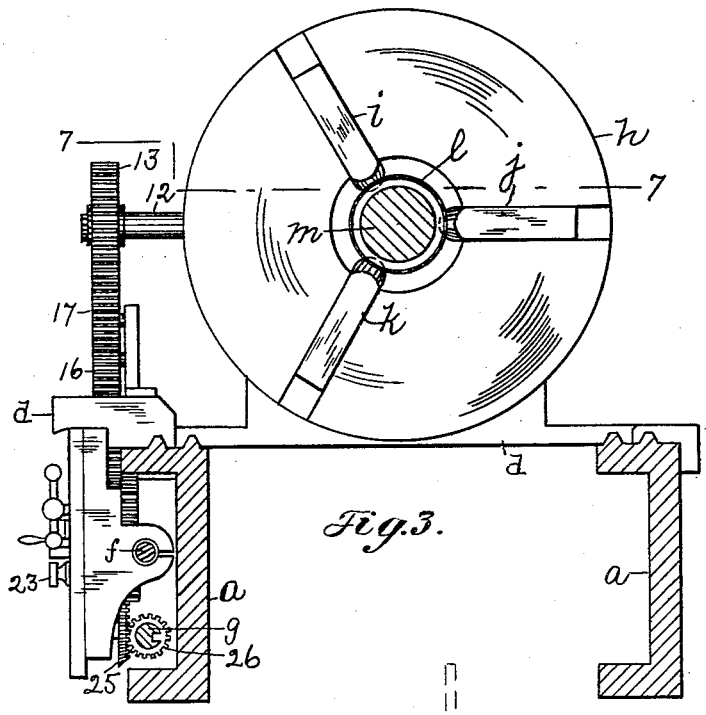
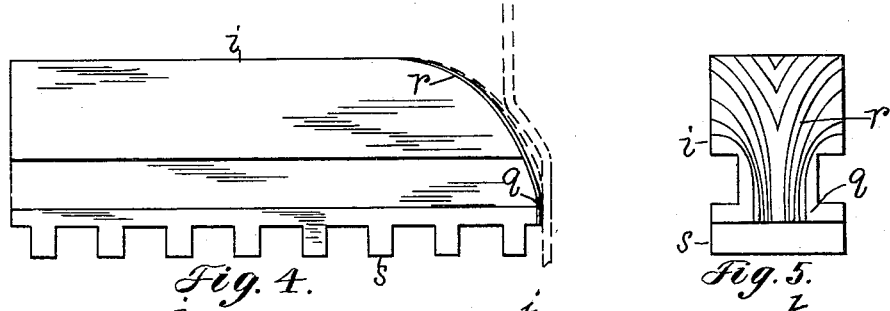
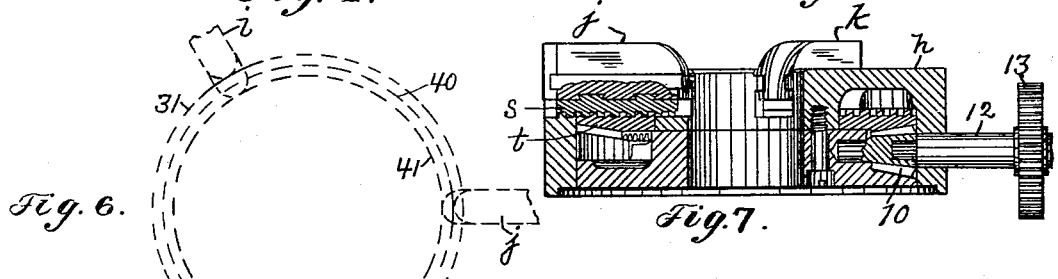
Witnesses.
Inventors.
Walter C. Sargeant
John J. Barker No. 733,428. Patented July 14, 1903.

UNITED STATES PATENT OFFICE.

WALTER C. SARGEANT, OF MELROSE, AND JOHN J. BARKER, OF ARLINGTON HEIGHTS, MASSACHUSETTS.

MACHINE FOR FORMING TAPERED TUBES.

SPECIFICATION forming part of Letters Patent No. 733,428, dated July 14, 1903.

Application filed January 31, 1902. Serial No. 91,956. (No model.)

*To all whom it may concern:*

Be it known that we, WALTER C. SARGEANT, residing in Melrose, and JOHN J. BARKER, residing in Arlington Heights, county of Middlesex, and State of Massachusetts, citizens of the United States, have invented an Improvement in Machines for Forming Tapered Tubes, of which the following description, in connection with the accompanying drawings, is a specification, like characters on the drawings representing like parts.

This invention relates to a machine for forming tapered tubes from a cylindrical tube or blank.

The invention is especially designed and adapted for forming tapered copper tubes, commonly known as "underwriter" tubes which are employed in the manufacture of hose-nozzles for use in factories, mills, and like places.

The invention relates more particularly to the tool with which the cylindrical metal tube is reduced or drawn down over a tapering mandrel and to an automatic feed for said tool, whereby the latter is caused to act on the tube with a uniform pressure during the drawing-down action. These and other features of this invention will be pointed out in the claims at the end of this specification.

Figure 1 is a side elevation, with parts broken away, of a machine embodying this invention; Fig. 2, a plan view of the machine shown in Fig. 1; Fig. 3, a cross-section on the line 3 3, Fig. 1; Fig. 4, a detail in side elevation of the drawing-down tool; Fig. 5, an end elevation of the drawing-down tool; Fig. 6, a diagrammatic view, to be referred to; Fig. 7, a sectional detail of the tool-holder, and Fig. 8 a diagrammatic view illustrating the drawing-down action.

The main portion of the machine may be an engine-lathe of any usual or suitable construction, such as now commonly employed in machine-shops, and comprising, essentially, the bed $a$, head-stock $b$, tail-stock $c$, carriage $d$, and mechanism for effecting the feed or movement of the carriage, which mechanism comprises, essentially, the gears $e$, screw-rod $f$, and shaft $g$.

The carriage $d$ is provided with a chuck or tool-holder $h$, carrying a plurality of tools, herein shown as three in number and lettered $i\ j\ k$, which are radially disposed on the chuck and operate on a cylindrical copper or other metal tube $l$, secured at one end on a tapering mandrel $m$ in any suitable manner, as by one or more set-screws $o$, inserted through a collar $p$. Each tool referred to is provided with a working-surface at its end comprising a straight portion $q$ and a curved portion $r$, and for the best results these surfaces in the different tools are of different length, for a purpose as will be described. The portion $r$ of each tool is curved longitudinally and transversely, as represented in Fig. 5. The tools $i\ j\ k$ are set in their carrier or chuck at about one hundred and twenty degrees apart and are automatically moved toward the mandrel as the copper tube $l$ is drawn down. Each tool is provided with a rack-bar $s$, (see Fig. 7,) which engages the convoluted upper surface of a bevel-gear $t$, located within the chuck or tool-carrier and rotated by a bevel-pinion 10 on a shaft 12, extended outside of the chuck and provided with a gear 13, which, as shown in Fig. 1, is driven from a main gear 14 through intermediate gears 15 16 17, the gear 15 being mounted in a movable support, shown as a lever 18, pivoted to the carriage and having its long arm 20 engaged by a cam 21 on a shaft 22, having bearings in the said carriage and provided with a thumb-piece or handle 23, (see Fig. 2,) by which the said shaft may be turned to raise and lower the long arm of the lever and engage and disengage the gear or pinion 15 with and from the gear 14 and pinion 16. The gear 14 is driven from the shaft $g$ by intermediate gears 25 and a bevel-pinion 26 on the shaft $g$, which bevel-pinion is keyed on said shaft to move longitudinally thereon to control the feed of the carriage in a manner common to this class of machines.

As shown in Fig. 1, the machine is in the act of drawing down the cylindrical tube to conform to the shape of the mandrel, and during the travel of the tool-holder in the direction indicated by the arrow 30 the tools i j k are automatically fed in a radial direction into proper working relation with the mandrel and the cylindrical tube thereon as long as the gear 15 is held in engagement with the gear 14, which, as above described, is effected in the present instance by the cam 21 raising the long arm of the lever 20. By turning the shaft 22 so as to lower the cam or turn it down the long arm of the lever is permitted to drop or is lowered sufficiently to move the gear 15 out of engagement with the gear 14 and pinion 16, thus stopping the automatic feed of the tools. By reason of the difference in the length of the straight portion of the working face of the tools i j k the curved portions of the said tools engage the tube at different points out of line with each other—that is to say, the tool i with the longest straight portion first engages the cylindrical tube, as shown by dotted lines, Fig. 4, and represented by the circle 31 in Fig. 6, the tool j next engages the portion of the tube which has been partially drawn down, as represented by the circle 40, and the tool k engages the tube after the tool j, as represented by the circle 41. These tools being set at about one hundred and twenty degrees apart press upon the tube at three points substantially equidistant, with the result that the circular form of the tube is maintained and the tendency of the tube to elongate transversely into substantially the form of an ellipse, with its consequent danger of being cracked or being broken by the tools in the drawing-down action, is avoided.

The drawing-down operation may be clearly understood from the diagram Fig. 8, wherein the outside line represents the action of the tool i, the curved surface of which acts on the revolving cylindrical tube l and forms practically a spiral corrugation, the highest portion 35 of which is engaged by the curved surface of the tool j and is thereby reduced to substantially the position and form represented by the curved line 36, and the portion acted upon by the tool j is next reduced by the curved surface of the tool k into substantially the position and form shown by the line 37, which represents the tube reduced to substantially a straight line, after which the straight portions of all the tools act on the reduced tube and straighten out any irregularities or imperfections and render the reduced tube smooth, besides at the same time polishing the same, with the result that a tapering tube is obtained which is smooth on its outer and inner surfaces and suitable for immediate use without the necessity of subsequent treatment. By means of the automatic feed for the tools in a radial direction the cylindrical tube is reduced by a pressure which is uniform from the beginning to the end of the operation, with the result that the finished tube is perfectly straight and polished on the inside, thereby reducing to a minimum the friction caused by the water passing through the tube when in use.

With the machine herein shown the cylindrical tubes treated may be reduced without loss due to the working of the apparatus.

It will be understood that the mandrel and its attached tube revolve while the tool-carrier is moved longitudinally of the mandrel.

We claim—

1. In a machine of the class described, the combination with a tapering mandrel, means to revolve it, a tool-carrier provided with a plurality of tools radially disposed with relation to said mandrel and provided with curved and straight working surfaces, means for moving said tool-carrier longitudinally of said mandrel, mechanism for automatically feeding said tools toward the mandrel as said carrier is moved longitudinally thereof, and means for rendering said automatic feed mechanism operative and inoperative without movement of said tools, substantially as described.

2. In a machine of the class described, the combination with a tapering mandrel, means to revolve it, a tool-carrier, means to move it longitudinally of said mandrel, a tool to act on the tube on said mandrel, movable toward and from said mandrel, means for automatically feeding said tool toward the mandrel as the said tool is moved longitudinally of the mandrel, and means for controlling said automatic feed without movement of said tool, substantially as described.

3. In a machine of the class described, the combination with a tapering mandrel, means to revolve it, a tool-carrier provided with a plurality of tools having their working surfaces composed of curved and straight portions of unequal length, whereby the curved surfaces of said tools successively act on the work and the straight portions simultaneously act on said work and means to move said tool-carrier longitudinally of said mandrel, substantially as described.

4. In a machine of the class described, the combination with a tapering mandrel, means to revolve it, a tool-carrier provided with a tool having its working surface composed of straight and curved portions, whereby the straight portion acts on the work after the curved portion, and means to move said tool-carrier longitudinally of said mandrel, substantially as described.

5. In a machine of the class described, the combination with a mandrel, of a tool-carrier, mechanism for moving said carrier longitudinally of said mandrel, a tool radially disposed on said carrier, gears for automatically feeding said tool toward said mandrel, a movable support for one of said gears, and means for moving said support to engage and disengage the gear carried by it with others of said gears, to control the automatic feed of the tool, substantially as described.

6. The herein-described tool provided with a working face composed of a straight portion $q$ and a transversely and longitudinally curved portion $r$, substantially as described.

In testimony whereof we have signed our names to this specification in the presence of two subscribing witnesses.

WALTER C. SARGEANT.
JOHN J. BARKER.

Witnesses:
JAS. H. CHURCHILL,
J. MURPHY.